United States Patent [19]

Syrenne

[11] 4,429,423
[45] Feb. 7, 1984

[54] COMBINATION WATER SAVER AND DISINFECTANT DISPENSER

[76] Inventor: Marius H. Syrenne, 1604-9th Ave. North, Saskatoon, Saskatchewan, Canada, S7K 3A1

[21] Appl. No.: 501,846

[22] Filed: Jun. 7, 1983

Related U.S. Application Data

[63] Continuation-in-part of Ser. No. 249,493, Mar. 31, 1981, abandoned.

[51] Int. Cl.³ .............................................. E03D 9/03
[52] U.S. Cl. ...................................................... 4/225
[58] Field of Search .................................. 4/223–225, 4/228, 415; 137/441

[56] References Cited

U.S. PATENT DOCUMENTS

| | | | |
|---|---|---|---|
| 1,671,361 | 5/1928 | Frankenberger | 137/441 |
| 2,808,246 | 10/1957 | Chambers | 137/442 X |
| 3,001,210 | 9/1961 | Diehl | 4/225 |
| 3,066,691 | 12/1962 | Lengyel | 137/441 X |
| 3,869,069 | 3/1975 | Levey et al. | 4/228 X |
| 3,911,507 | 10/1975 | Johnson | 4/224 |
| 4,145,775 | 3/1979 | Butler | 4/415 |

*Primary Examiner*—Charles E. Phillips
*Attorney, Agent, or Firm*—Stanley G. Ade

[57] ABSTRACT

A container is detachably secured to the overflow pipe in a toilet tank and holds soluble disinfectant. A tube connected to the water inlet valve branch normally connected to the overflow pipe of the tank with the inlet valve and the outlet of the tube being controlled by the float valve. This tube includes a T-fitting, one leg of which extends downwardly through the cover of the container to adjacent the base. The other leg extends to the overflow pipe for restoring the water seal in the bowl after flushing. A venturi in the T-fitting extracts water containing dissolved disinfectant from the container, when a toilet is flushed, thus adding disinfectant to the bowl and to the water seal. A further T-fitting is provided in the tube upstream of the first T-fitting and is situated above the water level in the tank in order firstly, to act as a siphon breaker and secondly, to divert some of the water flowing to the overflow after flushing and during filling of the tank when the water inlet is open. This prevents the excess water beyond that required for replacement of the water seal, from discharging into the overflow. Apertures adjacent the upper end of the container permit filling of the container when the tank is full and transfer of the disinfected water within the tank to the water in the tank.

1 Claim, 3 Drawing Figures

COMBINATION WATER SAVER AND DISINFECTANT DISPENSER

This invention is a continuation-in-part application of U.S. patent application Ser. No. 249,493 filed Mar. 31, 1981 now abandoned.

BACKGROUND OF THE INVENTION

This invention relates to new and useful improvements in a disinfectant dispenser and a water saver adapted to be fitted within toilet tanks.

One example of a device of this type is shown in U.S. Pat. No. 3,001,210 (Diehl). In this patent, a container for disinfectant is provided in a toilet tank. Disinfectant is extracted from the container for passage to the toilet bowl by an injector which draws liquid from the disinfectant container by an induction effect caused by water flowing from the water inlet via the overflow pipe to the toilet bowl in a conventional manner.

In this arrangement, all the water directed from the water inlet toward the overflow pipe passes into the overflow pipe and acts to draw a small amount of the disinfectant liquid from the container.

The container of Diehl contains wholly disinfectant liquid which is not replenished by water from the toilet tank and hence requires frequent replenishment. To avoid excessively frequent replenishment, only small amounts of the liquid are drawn by the injector for passage to the toilet bowl and hence the injector is a satisfactory technique for withdrawing the small amount of liquid.

This type of arrangement where the liquid drawn from the container is a concentrated liquid is disadvantageous in that the container requires frequent replenishment. A much more satisfactory arrangement is one in which a solid or very concentrated liquid source of disinfectant is provided in a container with water from the tank being introduced into the container to extract some of the disinfectant from the very concentrate source. However, this technique requires very much more liquid to be extracted from the container and injected into the overflow for passage to the toilet bowl. The arrangement of Diehl is totally unsatisfactory for a container and concentrate source of this type since the injector cannot draw sufficient liquid from the container.

SUMMARY OF THE INVENTION

It is one object of this invention therefore to provide an improved arrangement of the type which uses a container receiving water from the tank to replenish a supply of relatively dilute disinfectant material.

Accordingly, the invention provides in a toilet assembly which includes a water tank connected to a water supply, an inlet assembly controllable by a float valve component, a toilet bowl operatively connected to said tank, an overflow pipe extending upwardly into the tank and connected to the bowl and having an outlet conduit operatively connected to the inlet assembly and to the overflow pipe for communicating water from said inlet assembly to the overflow pipe for replacing the water seal in the bowl after the flushing action, a disinfectant holding container, means to detachably secure said container within the tank, venturi means in said outlet conduit and an extractor conduit means extending from the outlet conduit downstream of the venturi downwardly into the container to adjacent the base thereof whereby water within said container is extracted from the container by water passing through the outlet conduit to said overflow pipe; the improvement comprising means for filling the container from the water within the tank, siphon means provided by an extension portion of said outlet conduit so as to extend to a position below said extractor conduit means whereby to increase the flow of water from said container to said overflow pipe, and an opening in the outlet condudit arranged above said water level of the tank when operatively full, upstream of said venturi and downstream of said inlet assembly.

It is one advantage of the invention that the device operates to add a soluble disinfectant to the water within the tank from a highly concentrated source, keeping same free from scum and the like and also adding a soluble disinfectant to the water as it is flushed from the same source, reducing the possibility of stains forming in the bowl and at the same time disinfecting and deodorizing the toilet bowl.

Another advantage of the invention is to provide a device of the character herewithin described which is readily fitted to existing toilet tanks and which may contain a soluble highly concentrated chemical within a bag or pouch which is easily removed when desired.

Another advantage of the invention is to provide a device of the character herewithin described which includes a siphon breaker and water saving device thereby reducing the quantity of water normally passing into the overflow pipe during the filling action of the tank beyond that which is required for replacing the water seal within the bowl.

A yet further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this spcification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
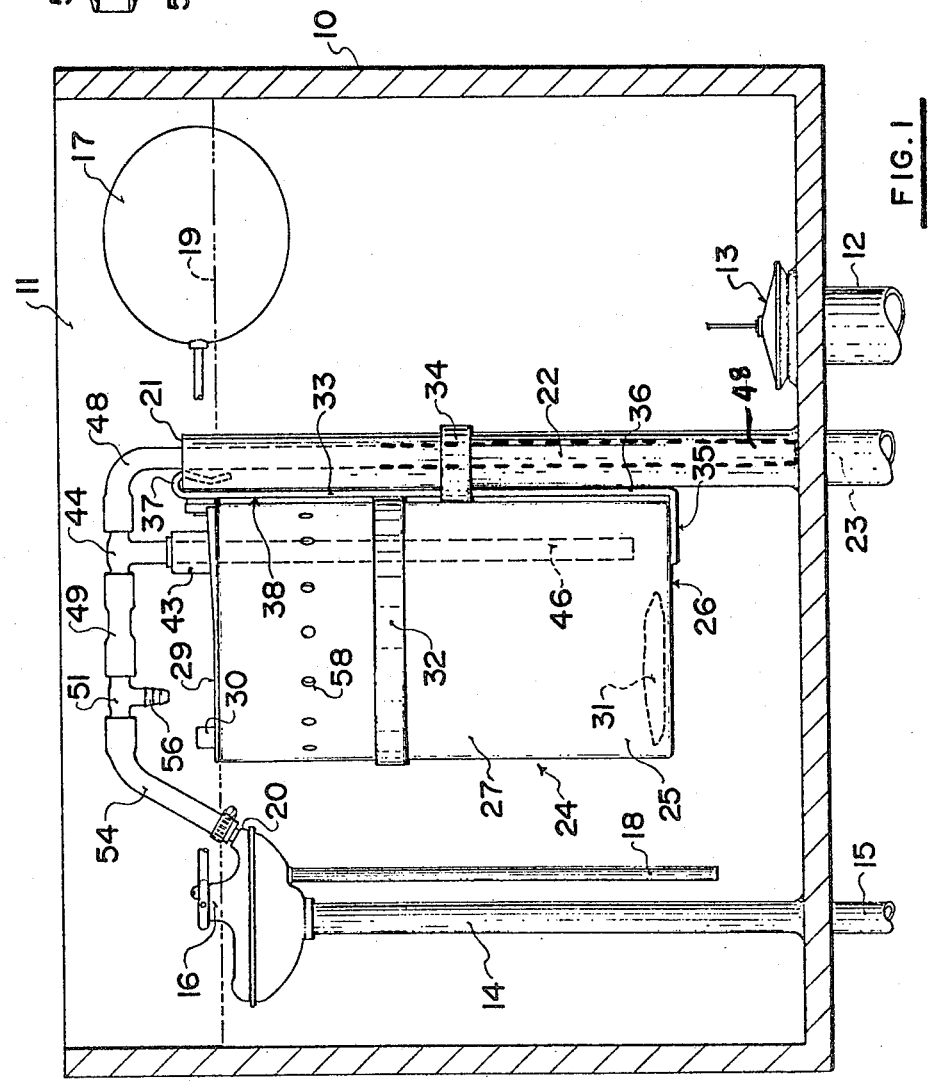
FIG. 1 is a partially schematic cross sectional view of a toilet tank with the invention installed therein.

Proceeding therefore to describe the invention in detail, reference should first be made to FIG. 1 which shows schematically, a conventional toilet tank 10 having a detachable cover 11, an outlet 12 leading to the toilet bowl (not illustrated) and controlled by an outlet valve 13 operable by the conventional handle (not illustrated). Also illustrated is a water inlet valve assembly collectively designated 14 connected to a source of water under pressure through conduit 15 and including a valve assembly 16 on the upper end thereof operatively connected to a float valve assembly 17, all of which is conventional. When the inlet valve assembly is open, water passes from the inlet conduit 15, through the valve assembly 16 and downwardly through the water filling conduit 18 into the tank thus filling same to the level indicated by reference character 19 and controlled by the float 17.

Also incorporated within the valve assembly 16, is a further water outlet 20 which normally is operatively connected to the open upper end 21 of the a conventional overflow conduit 22 extending upwardly within the tank and being connected at its lower end thereof to the toilet bowl by means of conduit 23. The overflow pipe 22 is provided for two reasons. Firstly, to take away excess water in the event that the valve assembly 16 becomes inoperative and secondly, and perhaps more importantly, to provide or replace the water seal within the toilet bowl after the flushing cycle.

Figure 2:
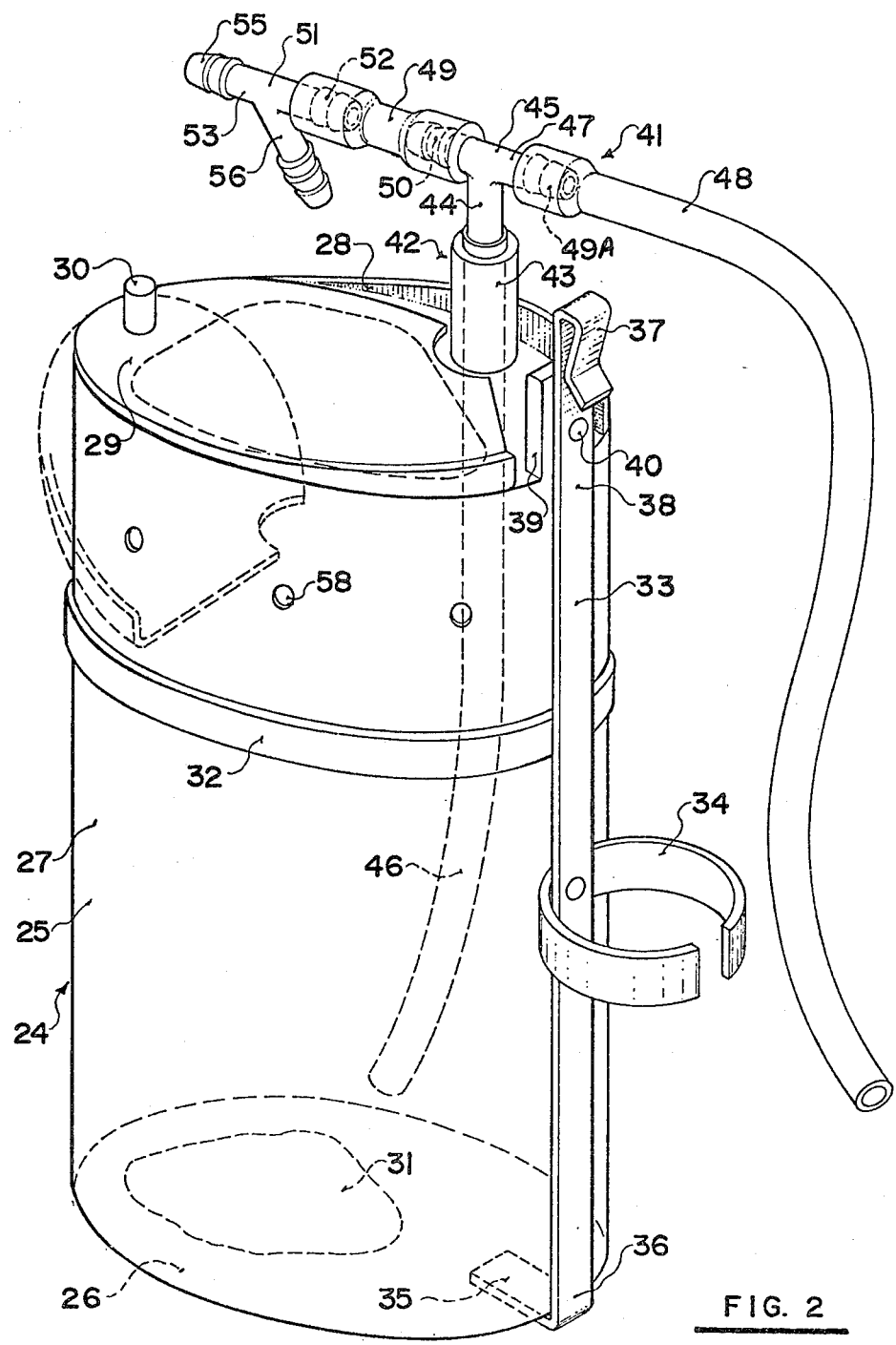
FIG. 2 is an isometric view of the invention per se.

The invention, collectively designated 24, is detachably supported within the tank 10. It consists of a container 25 having a base 26, a vertically extending ball 27, and a cover portion 28 with a hinged lid portion 29 forming part of the cover portion 28 and being hinged adjacent the location indicated by reference character 30 so that this hinged portion can be moved from the closed, substantially horizontal position shown in full line in FIG. 2 to the open position shown in phantom also in FIG. 2.

This permits access to the interior of the container so that a soluble chemical disinfectant may be inserted therein, preferably within a pouch or bag 30 so that the action of water upon the powder contained within the pouch, will disolve same slowly and allow the dissolved chemical to pass through the material of the pouch nd into the water within the container 25.

Due to space constrictions within a conventional toilet tank, it is preferable but not necessary to manufacture the tank with an oval cross sectional configuration.

Means are provided to detachably secure the container within the tank and in this embodiment, take the form of an encircling band 32 tightly engaging around the wall 27 with a vertical strut 33 being secured to the band intermediate the ends thereof and extending upwardly and downwardly therefrom, preferably in a location opposite to the side of the container having the hinge 30 for the lid portion 29.

A resilient clip 34 extends from the strut 33 just below the band 32 and a lug 35 extends inwardly from the lower end 36 of the strut with the base 26 of the container resting on lug 35.

A hook component 37 is formed on the upper end 38 of strut 33 and this upper end portion 38 may be secured to an upstanding lug 39 extending upwardly from the upper side of the wall 27. In this embodiment, rivet 40 secures the strut to the lug 39.

The resilient clip 34 snap engages around the overflow pipe 22 with the hook element 37 engaging the open upper end 21 of the overflow pipe. The relationship of the band 32, and the hooked portion 37, controls the position of the upper end or cover 28 of the container which should be approximately in line with the water level 19 when the tank is operatively full as indicated in FIG. 1.

The operative connection between the container assembly 24 and the outlet conduit between the valve 16 and the overflow pipe 22 may take the form of components inserted in series within the outlet connection or, alternatively, may be integral with the container assembly under which circumstances, of course, the conventional outlet conduit is removed from the outlet 20 of the valve and replaced by the outlet conduit assembly illustrated by reference character 41 in the drawings. Under these circumstances, flexible tubing may be utilized in conjunction with T-connectors as will hereinafter be described.

An extractor conduit assembly is provided within the container collectively designated 42. It includes an apertured and screw threaded boss 43 extending upwardly from the cover portion 28 into which the stem portion 44 of a T-connector 45, may be engaged with a length of tubing, preferably flexible, 46 extending downwardly from the lower end of the stem 44 to a position adjacent the base 26 of the container. The T-connector may be held within the boss 43 by any conventional means such as a clamp (not illustrated) or alternatively, the boss may be frictionally engaged within an aperture in the cover portion 28.

The straight through portion 47 of the T-connector 45 is placed in series with the outlet conduit assembly 41 with one length 48 of flexible tubing extending from one side 49A of the T-connector and leading into the open upper end 31 of the outlet conduit. The tube 48 is larger than the tube 46 so that when both are filled with water, a siphoning effect occurs to drain disinfectant water from the container 25.

A relatively short connector portion 49, preferably flexible, is engaged over the other end 50 of the straight through portion 47 and extends to be operatively connected to the outlet 20 of the valve assembly 16.

Preferably, but not essentially, a further T-connector 51 may be provided upstream of the connector 47 with one end 52 of the straight through portion 53 engaging the other end of conduit 49 and a further conduit 54, preferably flexible, extending from the other side 55 thereof to the outlet conduit portion 20 of the valve assembly 16, all of which is shown clearly in FIG. 1.

The stem 56 of the second T-connector 51 is open to atmosphere within the tank and above the water level 19 when operatively full thus acting as a siphon breaker as well as a water saver, as will hereinafter be described.

Figure 3:
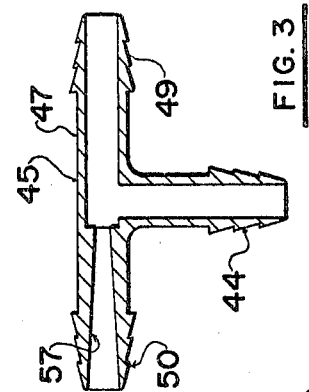
FIG. 3 is a cross sectional view of the T-junction connection between the extractor conduit and the outlet conduit.

Finally, reference should be made to FIG. 3 which shows the T-connector 45 being formed with a venturi 57 within the end portion 50 just upstream of the connection of the stem 44 thereto, in order to increase the speed and hence lower the pressure of water passing therethrough to assist in the extracting action of the water as it passes over the junction between the stem 44 and the straight through portion 47.

In operation, the container is mounted within the tank as hereinbefore described as illustrated with the upper surface or cover substantially flush with the water level 19. It will be noted that a plurality of small apertures 58 are formed through the wall of the container adjacent the upper end thereof and that these are below the water level 19 so that water passes through these apertures and fills the container 25 and this water dissolves the chemical within the pouch 31 thus forming a disinfectant solution within the tank, some of which seeps out through the apertures 58 particularly when the tank is flushed and the water is lowering from the level 19 to the level of the apertures.

When the tank is flushed, valve 13 opens allowing water to descend and pass through the outlet conduit 12 to the bowl. As the float 17 lowers, the valve 16 opens and water commences to pass through the tube 18 and also through the outlet 20, through the outlet conduit assembly 48 and into the overflow pipe 22. This is primarily to replace the water seal in the toilet bowl after the tank has been flushed and during the filling action and water flows through this outlet conduit assembly 48 all the time that the valve 16 is open.

The speed of the water passing through the outlet conduit 48, particularly assisted by the venturi 57, acts to draw some of the disinfected water from the container 25, upwardly through the extractor, at 46 whereby it mixes with the water passing through the outlet conduit assembly 48 to travel to the toilet bowl to replace the water seal.

As soon as the conduits 46 and 48 are filled with liquid, the siphoning effect is commenced which assists and at least partly overcomes the induction effect in extracting the disinfectant liquid from the container. In order to prevent the continuation of the siphoning action when the valve 16 has been closed, the siphon preventing opening 56 is provided which allows some further continuation of the siphoning action until the water in the pipe 49 is withdrawn and air communicated from the opening 56 to the pipe 46. This opening also acts to release some of the water passing from the valve 16 toward the overflow pipe thus acting as a water saver.

The siphoning effect therefore allows the extraction of greater quantities of water from the container than would be provided by the injector alone. In addition, the amount of water drawn directly from the supply is reduced so that even more disinfectant water is drawn from the container in place of the clear water from the supply.

At the same time, the water within the tank 10 is also disinfected by the disinfectant solution seeping out through holes 58 and this water flushes downwardly from the rim and assists in maintaining the bowl in a disinfected condition.

The stem portion 56 of the T-junction 51 prevents any undue siphoning action from continuing after the valve 13 has closed and the tank is filling. It also discharges a proportion of the water passing through the discharge conduit 48 in excess of that required to replace the water seal, it being understood that considerably more water than is required for replacing the seal, normally passes through the conduit 48 during the flushing and filling action of the toilet.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a toilet assembly which includes a water tank connected to a water supply, an inlet assembly controllable by a float valve component, a toilet bowl operatively connected to said tank, an overflow pipe extending upwardly into the tank and connected to the bowl and having an outlet conduit operatively connected to the inlet assembly and to the overflow pipe for communicating water from said inlet assembly to the overflow pipe for replacing the water seal in the bowl after the flushing action, a disinfectant holding container, means to detachably secure said container within the tank, venturi means in said outlet conduit and an extractor conduit means extending from the outlet conduit downstream of the venturi downwardly into the container to adjacent the base thereof whereby water with said container is extracted from the container by water passing through the outlet conduit to said overflow pipe; the improvement comprising means for filling the container from the water within the tank, siphoning means provided by an extension portion of said outlet conduit so as to extend to a position below said extractor conduit means whereby to increase the flow of water from said container to said overflow pipe, and an opening in the outlet conduit arranged above said water level of the tank when operatively full, upstream of said venturi and downstream of said inlet assembly.

* * * * *